United States Patent
Aviles

(10) Patent No.: US 7,941,591 B2
(45) Date of Patent: May 10, 2011

(54) FLASH DIMM IN A STANDALONE CACHE APPLIANCE SYSTEM AND METHODOLOGY

(75) Inventor: Joaquin J. Aviles, Austin, TX (US)

(73) Assignee: CacheIQ, Inc., Austin, TX (US)

( * ) Notice: Subject to any disclaimer, the term of this patent is extended or adjusted under 35 U.S.C. 154(b) by 497 days.

(21) Appl. No.: 12/180,731

(22) Filed: Jul. 28, 2008

(65) Prior Publication Data
US 2010/0023674 A1    Jan. 28, 2010

(51) Int. Cl.
G06F 12/00 (2006.01)
(52) U.S. Cl. ............... 711/103; 711/118; 711/E12.001; 711/E12.008; 711/E12.017
(58) Field of Classification Search .................. None
See application file for complete search history.

(56) References Cited

U.S. PATENT DOCUMENTS 7,345,926 B2    3/2008 Kagan et al.
2007/0297231 A1   12/2007 Gilton

OTHER PUBLICATIONS

WIKIPEDIA, DIMM, printed Jun. 5, 2008, http://en.wikipedia.org/wiki/DIMM.
Jim Cook, CommsDesign, Flash Memory 101: An Introduction to NAND Flash, Mar. 20, 2006, http://www.commsdesign.com.showArticle.jhtml!articleID=183700957, printed Jun. 11, 2008.
MICRON Technology, Inc., Technical Note, TN-29-07, Small-Block vs. Large-Block NAND Flash Devices, 2005.
MICRON Technology, Inc., Technical Note, TN-29-14, NAND Flash Performance Increase with Program Page Cache Mode Command, 2006.

*Primary Examiner* — Kevin Verbrugge
(74) *Attorney, Agent, or Firm* — Hamilton & Terrile, LLP; Michael Rocco Cannatti

(57) ABSTRACT

A method, system and program are disclosed for accelerating data storage in a cache appliance cluster that transparently monitors NFS and CIFS traffic between clients and NAS subsystems and caches files in a multi-rank flash DIMM cache memory by pipelining multiple page write and page program operations to different flash memory ranks, thereby improving write speeds to the flash DIMM cache memory.

20 Claims, 10 Drawing Sheets

FLASH DIMM IN A STANDALONE CACHE APPLIANCE SYSTEM AND METHODOLOGY

BACKGROUND OF THE INVENTION

1. Field of the Invention

The present invention is directed in general to the field of computer storage networks. In one aspect, the present invention relates to a standalone cache memory device which is connected between one or more host machines and a storage device.

2. Description of the Related Art

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device.

While a number of solutions have been proposed to address these problems, they are, for a variety of reasons, not entirely satisfactory. For example, faster disk drives have been developed, but the increased disk drive access speeds are not enough to overcome the performance gap. Other solutions have proposed increasing the size and speed of the cache memory at the NAS device(s), but this results in increased costs in terms of expense, chip size and power consumption, especially when dynamic random access memory is used. While there are cheaper forms of memory (such as non-volatile flash memory), the performance limitations of the cheaper memory (e.g., asymmetric read/write rates caused by relatively slow program rates) have made them unsuitable for providing a cache memory function. Accordingly, there is a need for a system and method for improving the disk storage access time to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided for using a high density flash cache memory to dynamically cache files by monitoring NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire. Data that is to be stored or written to the cache appliance is stored in a flash cache memory that is implemented with one or more dual in-line memory modules (DIMMs) by configuring a cache controller to expedite data write operations to the flash DIMM by pipelining multiple page write and page program operations to different flash memory ranks. To this end, the cache controller includes a page cache for sequentially transferring multiple data pages to two or more memory ranks in the flash DIMM while data pages that were previously transferred to other flash memory ranks in the flash DIMM are simultaneously being programmed. When NAND flash memory is used to implement a multi-rank DIMM, pipelining may be implemented by storing two or more pages (e.g., 4 KB/page) of data in the cache controller's page cache, and then transferring the data pages to program or data register(s) at the respective target memory ranks for each data page, along with the respective data programming commands to each memory rank. When the transfers are complete, the page cache at the cache controller is available to receive new data pages for additional, different memory ranks, while the transferred data at the program/data register(s) is simultaneously programmed into the respective target memory ranks. With this configuration, the read and write speeds to the NAND flash arrays are substantially symmetric, and are comparable to the performance of conventional SDRAM DIMMs while providing the other benefits (e.g., lower cost, less power consumption, higher capacity density, smaller cell size, etc.) associated with flash memory.

In accordance with various embodiments, a data operation (such as a request to read or write a file from a networked storage device) may be adaptively cached or serviced in the multi-rank flash DIMM memory of a non-disruptive storage cache appliance which uses packet inspection intelligence to splice connections under software control using the methodologies and/or apparatuses described herein, which may be implemented in a standalone cache appliance with computer program code comprising computer executable instructions. In whatever form implemented, a standalone cache unit receives a request from a remote client to perform a specified data operation at one or more networked data storage devices. The standalone cache unit inspects packet parameters in each TCP/IP stack layer associated with the request and determines if the request can be serviced by a flash DIMM cache memory located at the standalone cache unit. If the request can be serviced by the flash DIMM cache memory, the specified data operation is performed by the standalone cache unit. In operation, the flash DIMM cache memory is populated with a default cache engine policy which may be modified with a user-specified cache profile for selectively adjusting the default cache engine policy in accordance with business requirements of the user. In selected embodiments, the default cache engine policy comprises a least recently used with dual time reference algorithm aided with greedy dual size frequency algorithm, and the user-specified cache profile provides preferential access to the flash DIMM cache memory for files from a user-specified application data set. In other embodiments, the user-specified cache profile provides preferential access to the flash DIMM cache memory for files from a user-specified application data set in accordance with a predetermined schedule. In yet other embodiments, the user-specified cache profile provides preferential access to the flash DIMM cache memory for files from a client located at a predetermined IP address. The user-specified cache profile may also modify the default cache engine policy to provide preferential access to the flash DIMM cache memory for files from a predetermined location in a specified networked data storage device, or to provide preferential access to the flash DIMM cache memory for a predetermined set of files that are identified by one or more file path components, such as NAS subsystem, filer, volume, path, directory, name, extension and size. In yet other embodiments, the user-specified cache profile provides preferential access to the flash DIMM cache memory for one or more specified remote clients using one or more predetermined schedules that specify when each remote client has preferential access.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
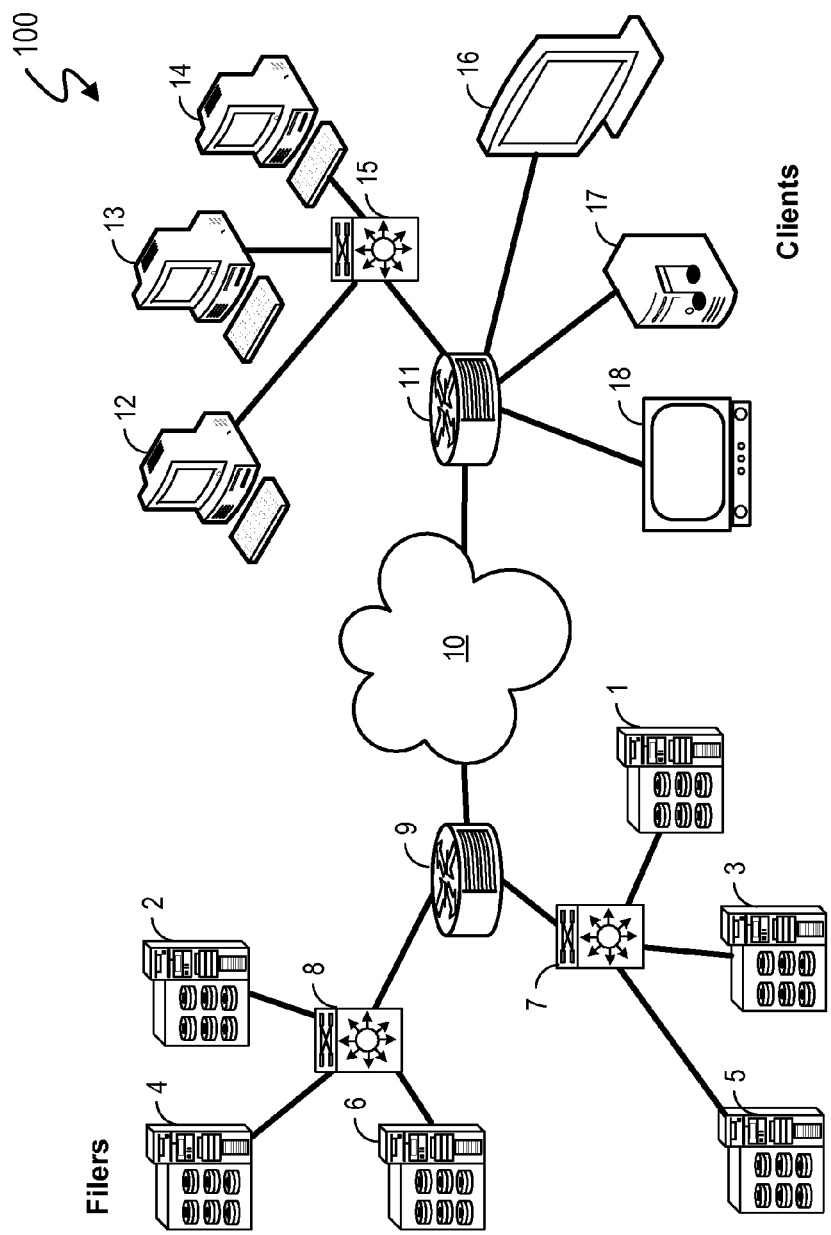
FIG. 1 depicts a typical NAS system in which client devices use a network to access storage resources on a number of remote network attached storage and file servers.

A method, system and program are disclosed for accelerating data storage access by adaptively caching selected data in a scalable, stand-alone cache appliance that transparently monitors NFS and CIFS traffic between clients and NAS subsystems and caches files using dynamically adjustable cache policies that reflect the business requirements and/or application workloads that change over time. In selected embodiments, one or more cache appliances may be connected or clustered together in front of an NAS filer (group) to provide low-latency access and redundancy in responding to both read and write requests for cached files, thereby improving access time to the data stored on the disk-based NAS filer (group). Instead of using DRAM memory to cache data at the one or more cache appliances, a NAND flash memory scheme is used to cache data by pipelining multiple page write and page program operations to different flash memory ranks in the flash memory, thereby providing a cache memory with higher capacity density, lower power consumption, lower cost, and smaller cell size than DRAM memory, while maintaining comparable read and write speeds. In an example NAND flash memory scheme, the flash DIMM is constructed with multiple independent sets of flash arrays, where each set (called a "rank") can be accessed simultaneously for the full data bit-width. With this construction, cache write operations are expedited by sequentially loading multiple pages into data registers at a first group of memory ranks in the multi-rank flash DIMM, while simultaneously programming a second group of memory ranks with other pages that were previously loaded into data registers at the second group of memory ranks. With an 8-rank flash DIMM cache memory embodiment where each rank includes its own set of data registers for storing data to be programmed into the rank, two ranks can be programmed simultaneously in the same amount of time required to load the data registers in two different ranks. As a result of pipelining multiple page write and page program operations, eight data pages can be written to the 8-rank flash DIMM cache memory in less than half the time than would be required to sequentially load and program eight pages using a normal page program operation. By operating the multi-rank flash DIMM cache memory as described herein, the cache appliance(s) may be provided with 512 GB of non-volatile, inexpensive, low power cache memory for dynamically caching data in accordance with adjustable caching policies to populate the multi-rank flash DIMM cache memory to reflect business requirements, to implement content matching algorithms and/or to reflect time-varying file access patterns, network utilization, file sizes and client load. The adjustable caching policies may be defined by the user as application profiles that identify application data sets and create policies that automate the management of those data sets in order to influence what files are to be cached and when. For example, application profiles may be used to identify a set of files that, when served from the cache appliance cluster, will increase the overall performance of the application by reducing or eliminating I/O bottlenecks. Application profiles may also be used to give higher caching priority to selected application data sets that have a positive impact on business, while giving lower caching priority to other application data sets. In addition, application profiles may be used to determine schedules for caching data sets from predetermined applications and/or to identify application clients whose application data sets are to be cached.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
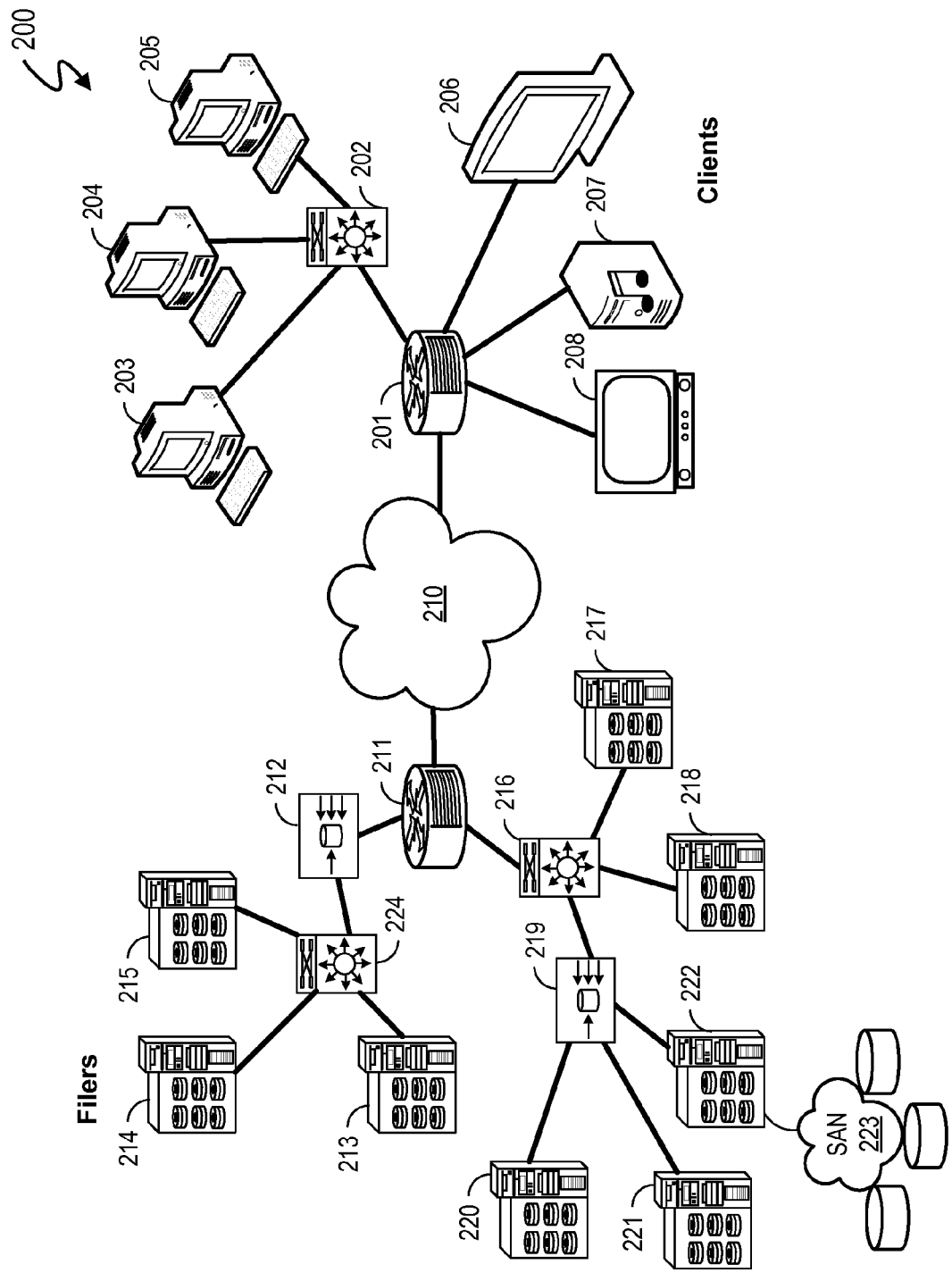
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server group (e.g., 213-215) or a file server (e.g., 222). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g., 212) may include one or more cache appliances that are connected or clustered together and working in tandem to form a single homogeneous caching device, as described more fully below. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the adaptive caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cluster is modified through an alternate path.

When provided with packet inspection capability, each cache appliance 212, 219 is able to inspect the packet information in each of the TCP/IP stack layers to determine the physical port information for the sender and receiver from the L2 datalink layer, the logical port information for the sender and receiver from the L3 network layer, the TCP/UDP protocol connection information from the L4 transport layer, and the NSF/CIFS storage protocol information from the L5 session layer. In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
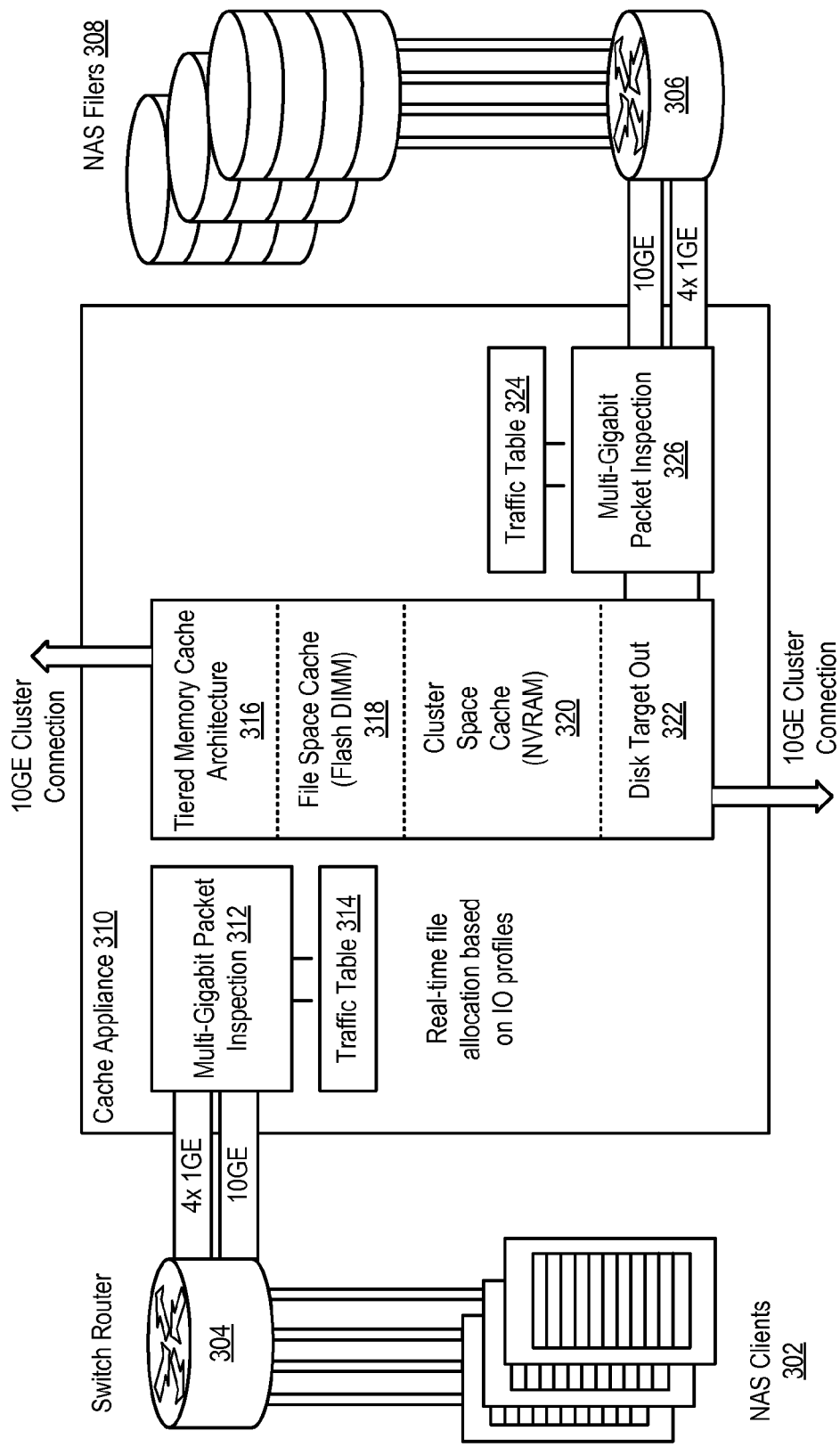
FIG. 3 depicts the functional operation of a non-disruptive storage cache appliance with packet inspection intelligence.

The functional operation of the packet inspection intelligence in the cache appliance may be described with reference to FIG. 3 which depicts the functional operation of a non-disruptive storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. For example, if the NAS client 302 requests application data that is stored on the cache appliance 310, the packet inspection hardware 312 may process the request by using an upstream traffic table 314 to perform real-time file allocation based on I/O profiles. If the packet inspection indicates that the request is to be processed by the cache appliance 310, the request is passed internally to the tiered memory cache system 316 which controls the cache storage into tiers. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a dynamic flash dual in-line memory module (DIMM) 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 326 to inspect the packets of incoming responses to determine if they should be passed inward for further processing by the cache appliance 310 or forwarded to another destination. For example, if the NAS filer 308 returns application data in response to a read request, the packet inspection hardware 326 may process the response for possible caching at the cache appliance 310 by using a downstream traffic table 324 to perform real-time file allocation based on I/O profiles. If the packet inspection indicates that the request is to be processed by the cache appliance 310, the request is passed internally to the tiered memory cache system 316 which controls the cache storage into tiers.

Figure 4:
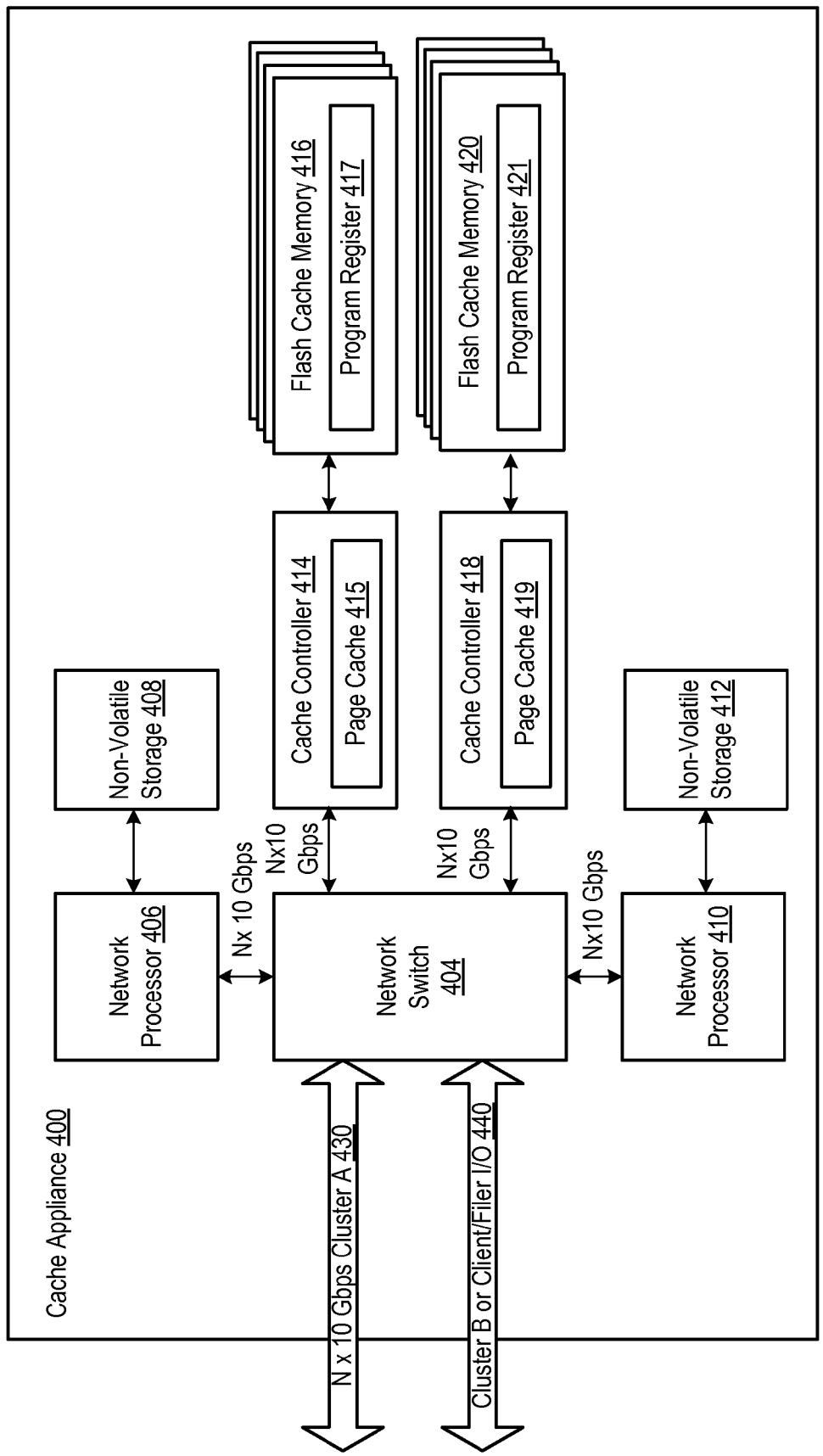
FIG. 4 is a block diagram of a cache appliance which uses flash DIMM cache memory in accordance with selected embodiments of the present invention.

As described herein, the cache appliance is the fundamental element of the data storage cache system, and is implemented as a combination of a high-speed packet processor and a large flash DIMM cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and flash DIMM cache memory component for storing cached data files.

The central element of the cache appliance hardware 400 is a high-speed network switch 404. The network switch 404 provides client and filer interfaces, 10 Gbps cluster interfaces, and multiple 10 Gbps connections to the packet processing and cache controller hardware. The network switch 404 manages data flow between the I/O ports 430, 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, cluster communication, packet processing, cache management, and client/filer communication. In a selected embodiment, two NPUs 406, 410 are provided, where each NPU may be implemented as a multi-threaded multi-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial flash cache memory 416, 420 for dynamically caching data files. With the dynamic flash cache memory units 416, 420, a substantial amount of non-volatile random access memory (e.g., 128-512 Gigabytes) may be provided in the form of a multi-rank NAND flash memory, though a NOR flash memory arrangement may also be used. To control the dynamic flash cache memory, two cache controllers 414, 418 are provided, respectively for each flash DIMM cache memory 416, 420. Each cache controller 414, 418 is responsible for connecting both the flash DIMM cache memory 416, 420 and the non-volatile storage 408, 412 to the high-speed interconnect within the cache appliance 400. In addition, the cache controllers 414, 418 may offload some cache memory lookup and coherency functions from the network processors 406, 410.

To increase the caching capacity and performance of the data storage cache system, a cache appliance may be connected or clustered with one or more additional cache appliances on a private network so that the appliances work in tandem to form a single homogeneous caching device. As described above, each cache appliance 400 contains a set of network processing resources, dynamic storage, and non-volatile storage that are combined as a pool of resources which may be treated as a node on the network. To this end, each cache appliance 400 includes I/O ports 430, 440 that allow the cache appliance 400 to be connected to another cache appliance.

To implement the flash cache memory, a multi-rank flash DIMM cache 500 may be used which includes a plurality of flash memory integrated circuit devices organized into a plurality of ranks using a "×4" or "×8" configuration (not including spare arrays) and mounted on a printed circuit board. The number of ranks (e.g., 8) on the flash DIMM cache refers to the number of independent sets of flash memory integrated circuit devices (e.g., D1-D9) that can be accessed simultaneously for the full data bit-width (e.g., 72 bits) of the flash DIMM cache. In the example embodiment shown in FIG. 5, the flash DIMM cache 500 includes 8 memory ranks 501-508, each of which can be separately accessed. The integrated circuit devices in each rank (e.g., rank R4 504) may use a high-speed CMOS 2 GB flash memory die having a main array portion (e.g., 2G×8 bit) and a spare array portion (e.g., 64M×8 bit) organized in a predetermined configuration (e.g., ×72=64 bit main and 8 bit spare), where the main array portion is the primary storage area, while the spare area is typically used for ECC, wear-leveling, replacement, or other software overhead functions.

Figure 5:
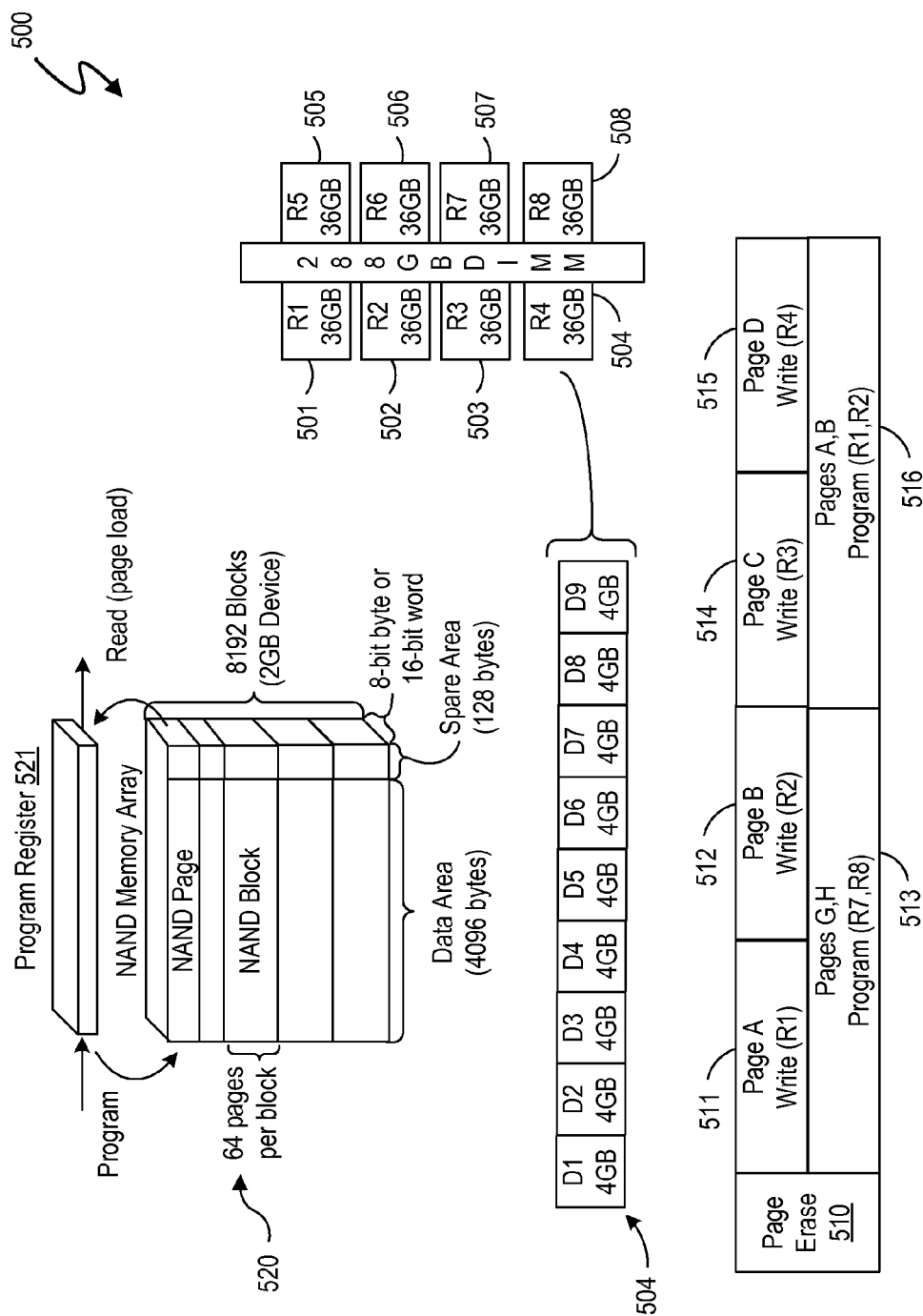
FIG. 5 depicts in simplified schematic form the design and operation of a multi-rank flash DIMM cache memory in accordance with selected embodiments of the present invention.

Though not shown, if each integrated circuit device (e.g., D1) is formed from a single 2 GB flash memory die (e.g., Samsung's K9KAG08U0M 2 GB NAND flash memory), then each rank (e.g., 504) allows up to 18 GB (16 GB main and 2 GB spare) to be separately accessed, and the total capacity of the flash DIMM cache 500 would be 144 GB (128 GB main and 16 GB spare). In other embodiments such as shown in FIG. 5, a higher density solution is provided by forming each integrated circuit device (e.g., D1) as a 4 GB flash memory formed with two 2 GB dies in a thin small-outline package (TSOP) with two chip selects (e.g., Samsung's K9WBG08U1M 4 GB NAND flash memory), in which case each rank (e.g., 504) allows up to 36 GB (32 GB main and 4 GB spare) to be separately accessed, and the total capacity of the flash DIMM cache 500 would be 288 GB (256 GB main and 32 GB spare). Even higher density solutions can be provided by forming each integrated circuit device (e.g., D1) as a 8 GB flash memory (not shown) formed with two 4 GB TSOPs stacked with four chip selects (e.g., Samsung's K9NCG08U5M 8 GB NAND flash memory), in which case each rank (e.g., 504) allows up to 72 GB (64 GB main and 8 GB spare) to be separately accessed, and the total capacity of the flash DIMM cache 500 would be 576 GB (512 GB main and 64 GB spare). Regardless of the total capacity, when the capacity of the flash cache memory 500 is based on 2 GB flash memory dice 520, the memory may be organized as a large-block device so that each individual 2 GB memory cell array ((2G+64M)×8 bit) contains blocks made up of 64 pages, where each page contains 4 KB (4,096 bytes+128 spare bytes). For a 2 GB NAND flash device, this translates to 8,192 blocks in the large-block organization, where individual blocks (e.g., 256 KB main+8 KB spare) can be individually erased, and individual pages (e.g., 4 KB main+128 B spare) can be separately programmed. However, it will be appreciated that other organization schemes (e.g., small-blocks, different page sizes, etc.) may be used.

To support read and write operations, each of the flash memory devices (e.g., D1) may include a NAND memory array 520 and a data or program register 521. When reading a page of data from a flash memory device D1, the data page is first transferred or loaded from the NAND Flash array 520 to the data register 521, which requires a relatively short transfer or load time. When a page of data is being programmed into the flash memory device D1, the data is clocked into the device serially and stored in the data register 521 where it is held while the NAND Flash array 520 is programmed. As will be appreciated, the programming time may be on the order of 200 microseconds (typical) or 700 microseconds (maximum) per page, which is at least twice as long as than the time required to clock the data into the program/data register 521 (which may be on the order of 30 ns). For illustration purposes, and assuming a typical load time of 100 microseconds, the time required to sequentially load and program eight pages using a normal page program operation would be 2400 microseconds (=8 pages×(200 microseconds program time per page+100 microseconds load time per page)). The total time for sequentially loading and programming eight pages is shown at timeline 1001 in FIG. 10. To provide faster memory access, NAND flash memory devices can use a program page cache mode of operation which pipelines data to the NAND flash device D1 by inputting a page of data to a cache register (not shown) and then transferring the data to the data register 521 when a cache programming command is issued. When the transfer to the data register 521 is complete, the cache register is available to receive new data input while the data register 521 simultaneously programs the NAND flash array 520. By providing a double-buffered technique which uses the data register 521 as a holding register to supply the programming of the array 520, the cache register is freed so that the next sequential page operation can be loaded in parallel. In this way, the program page cache mode provides performance improvement over normal program page operations. To provide a comparative example which again assumes a typical load time of 100 microseconds, the time required to sequentially load and program eight pages using the program page cache mode of operation would be approximately 1700 microseconds (=100 microseconds load time for the first page+(8 pages×(200 microseconds program time per page)). The total time for loading and programming eight pages using the program page cache mode is shown at timeline 1002 in FIG. 10.

In accordance with selected embodiments of the present invention, the data write throughput may be substantially increased by pipelining multiple pages of data to different memory ranks in the multi-rank flash DIMM cache 500 so that multiple pages are simultaneously programmed to one set of memory ranks while the data/program registers in another set of memory ranks are loaded with additional pages. In FIG. 5, this operation is depicted in simplified schematic form with the example sequence 510-516 which begins at step 510 when a page in the flash memory array is erased. As will be appreciated, the page that is erased is the page in the memory array (e.g., 520) where the intended data page is to be written. Typically, a page is erased by erasing the block in which the page is located, where erasing a block typically requires a minimum block erase time (e.g., 1.5 ms), though the individual page may instead be erased which would require a shorter page erase time.

After the intended page location in the flash memory array is erased, a first data page (e.g., Page A) is transferred or loaded into the program register(s) for a first memory rank (e.g., rank R1 501) at step 511, followed in sequence by the transfer of a second data page (e.g., Page B) into the program register(s) for a second memory rank (e.g., rank R2 502) at step 512. At the same time that the first and second pages are sequentially loaded during steps 511, 512, two other memory ranks (e.g., rank R7 507 and rank R8 508) are simultaneously being programmed (step 513) with the data pages (e.g., Page G and Page H, respectively) that were previously loaded into the program register(s) for memory ranks R7 and R8. Because the programming time for each of the memory ranks R7 and R8 is relatively long, this time may be used to sequentially load two more data pages (Pages A and B) into the first two memory ranks (R1 and R2). Once the program registers in the first and second memory ranks R1, R2 are loaded, the sequence of pipelining program operations in parallel with the sequential loading of program registers can be repeated with additional pages so that a third data page (e.g., Page C) and fourth data page (e.g., Page D) are sequentially transferred or loaded into the program register(s) for the a third memory rank (e.g., rank R3 503) and fourth memory rank (e.g., rank R4 504) at steps 514 and 515, respectively, while at the same time that the previously loaded first and second pages in memory ranks R1 and R2 are simultaneously being programmed (step 516 with the data pages (e.g., Page A and Page B, respectively). Continuing with the example where a typical load time requires 100 microseconds and a typical program time requires 200 microseconds, the time required to sequentially load and program eight pages by pipelining multiple page program operations would be approximately 1000 microseconds (=2×100 microseconds to sequentially load the first two pages+(8 pages×(200 microseconds program time/ two pages in parallel)). The total time for loading and programming eight pages by pipelining page load and program operations to multiple memory ranks is shown at timeline 1003 in FIG. 10.

While these example scenarios illustrate how the write throughput may be increased by pipelining multiple pages in parallel to multiple memory ranks, it will be appreciated that the actual read and write performance will depend on the specific configuration and performance of the flash memory arrays in the multi-rank flash DIMM cache 500. For example, a 288 GB NAND flash DIMM memory constructed from 4 GB TSOP flash memory integrated circuit devices which pipelines multiple pages to multiple memory ranks can provide sequential 64-bit read operations at 400 MBPS and sequential 64-bit write operations at 147 MBPS. In comparison, the maximum theoretical 64-bit read and write performance for a 8 GB SDRAM DIMM is 1.64 GBPS, which provides a much lower storage capacity for the same chip count and size.

Figure 6:
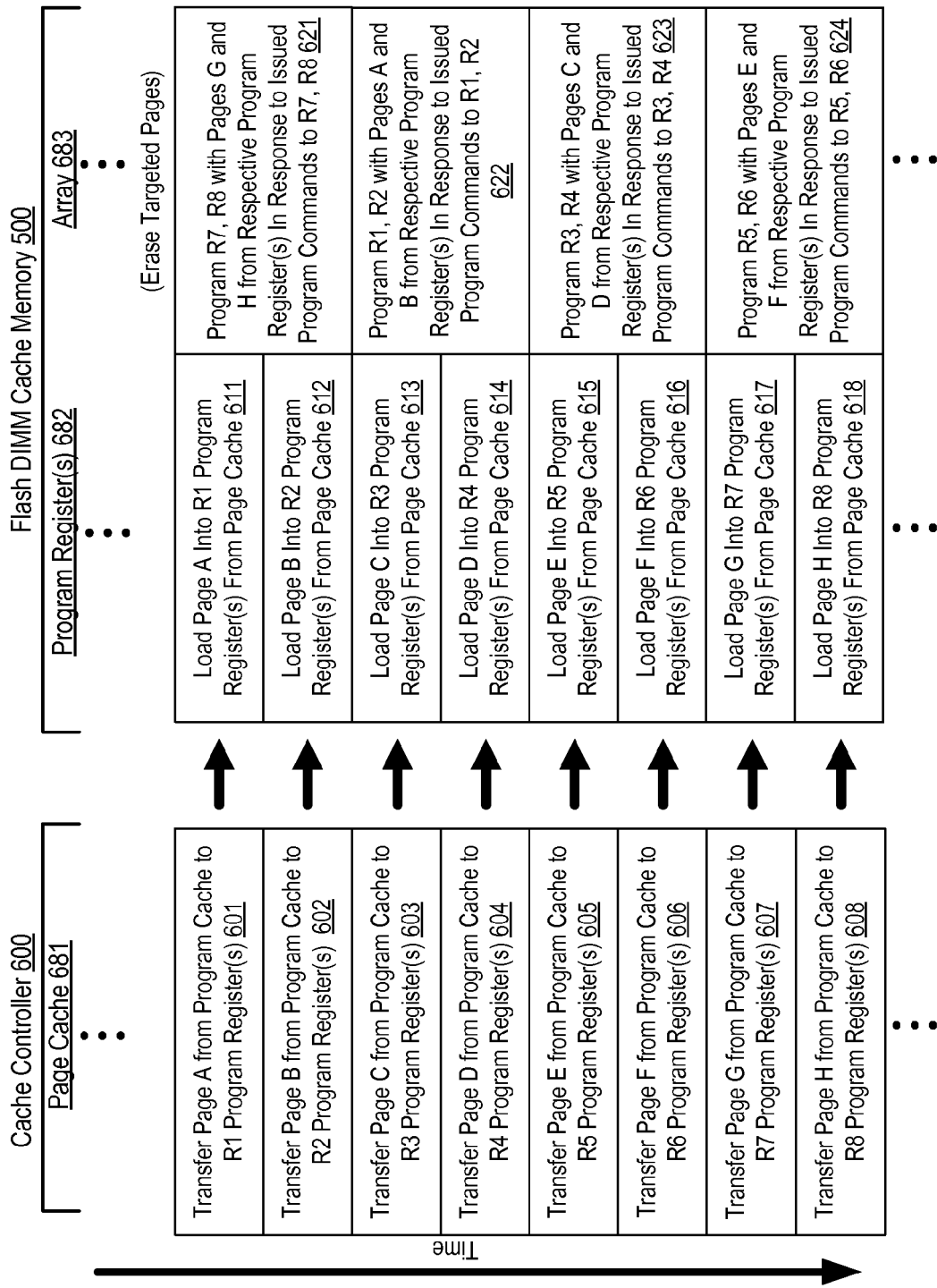
FIG. 6 depicts an example process flow sequence for pipelining multiple data pages to the multi-rank flash DIMM cache memory shown in FIG. 5.

The reason for sequentially loading the program registers in different memory ranks are is that the different memory ranks in the flash DIMM memory (e.g., 416) are all controlled by the same cache controller (e.g., 414) which uses a single page cache memory 415 to read and write data to the memory ranks in the flash DIMM memory. The role of the page cache memory at the cache controller is shown FIG. 6 which depicts an example process flow sequence for pipelining multiple data pages to the multi-rank flash DIMM cache memory 500 shown in FIG. 5. In particular, a page cache 681 at the cache controller 600 transfers a first page (Page A) to first memory rank (R1) (step 601), where the page is received and loaded at program registers 682 of the first memory rank (R1) in the flash DIMM memory 500 (step 611). After transferring the first page, the cache controller 600 transfers a second page (Page B) from the page cache 681 to the second memory rank (R2) (step 602), where they are received and loaded at program registers 682 of the second memory rank (R2) in the flash DIMM memory 500 (step 612). At this point, the cache controller 600 has issued a program command to the first and second memory ranks (R1, R2). While the first and second pages are being transferred to the program registers 682 in the first and second memory ranks (R1, R2), two other memory ranks R7, R8 in the array 683 are simultaneously being programmed with other pages (Pages G and H) in response to receiving program commands at the other memory ranks R7, R8 (step 621), where Pages G and H were previously loaded in the program registers 682 for the other memory ranks R7, R8. Thus, one group of memory ranks are programmed in parallel with previously loaded data pages while another group of memory ranks is sequentially loaded with other data pages. After the first and second pages are sequentially transferred to the program registers 682 (and the other memory ranks R7, R8 are programmed), the sequence is repeated so that the page cache 681 sequentially transfers third and fourth pages (Pages C and D) to different memory ranks (e.g., R3 and R4) (steps 603-604), where they are received and loaded at program registers 682 (steps 613-614). While the Pages C and D are being transferred to the program registers 682 (steps 603-604, 613-614), the first two memory ranks R1, R2 in the array 683 are simultaneously being programmed with the previously loaded Pages A and B in response to receiving program commands (step 622). In similar fashion, Pages E and F are subsequently transferred sequentially to the program registers 682 in memory ranks R5, R6 (steps 605-606, 615-616) while memory ranks R3, R4 in the array 683 are simultaneously being programmed with the previously loaded Pages C and D (step 623), and then Pages G and H are subsequently transferred sequentially to the program registers 682 in memory ranks R7, R8 (steps 607-608, 617-618) while memory ranks R5, R6 in the array 683 are simultaneously being programmed with the previously loaded Pages E and F (step 624).

Figure 7:
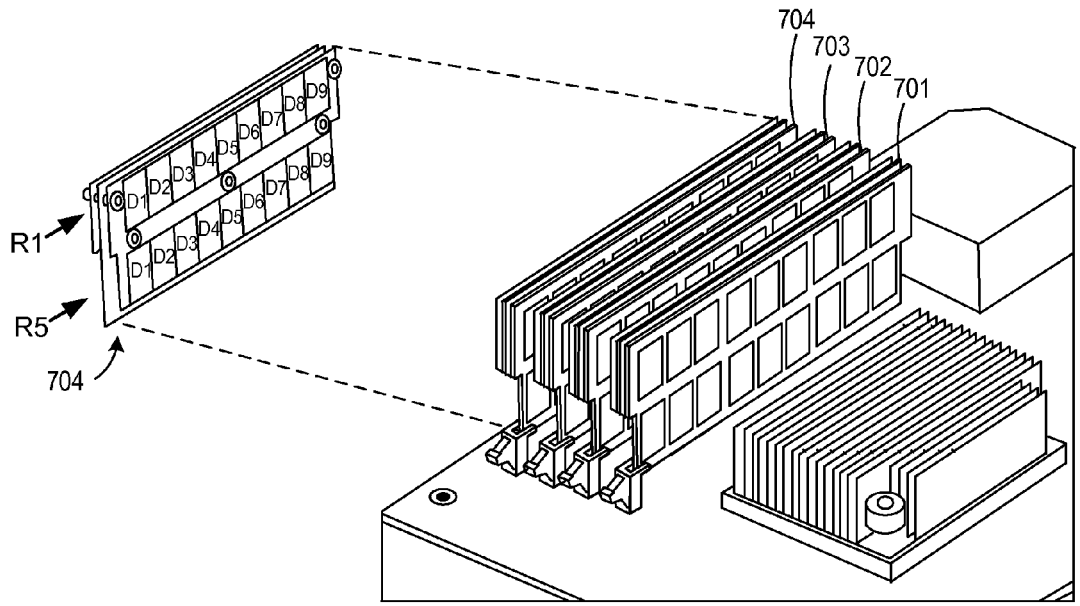
FIG. 7 is perspective view of a multi-rank flash DIMM memory implemented with multiple flash DIMMs in a motherboard in accordance with selected embodiments of the present invention.

It will be appreciated that the multi-rank flash DIMM cache memory 500 may be implemented with a plurality of dual in-line memory modules, each having a plurality of flash random access memory integrated circuits mounted on a printed circuit board that is designed for use in personal computers. For example, to implement an 8-rank flash DIMM memory, four separate dual-rank flash DIMMs 701-704 may be mounted in a motherboard, as illustrated with the perspective view of FIG. 7. Each dual-rank DIMM (e.g., 704) includes two independent sets of flash memory devices (D1-D9) that are arranged into separate memory ranks (e.g., R1, R5) that can be accessed simultaneously for the full data bit-width of the DIMM to be driven on the bus. On the dual rank DIMM (e.g., 704) where only one of the ranks (R1 or R5) can be accessed at a time, the selection of memory ranks for the pipelined programming operations must take this access limitation into account. While dual rank DIMMs are shown in FIG. 7, DIMMs are currently being commonly manufactured with up to four ranks per module, and it is contemplated that selected embodiments of the present invention may be used with even higher-ranked DIMMs.

Figure 8:
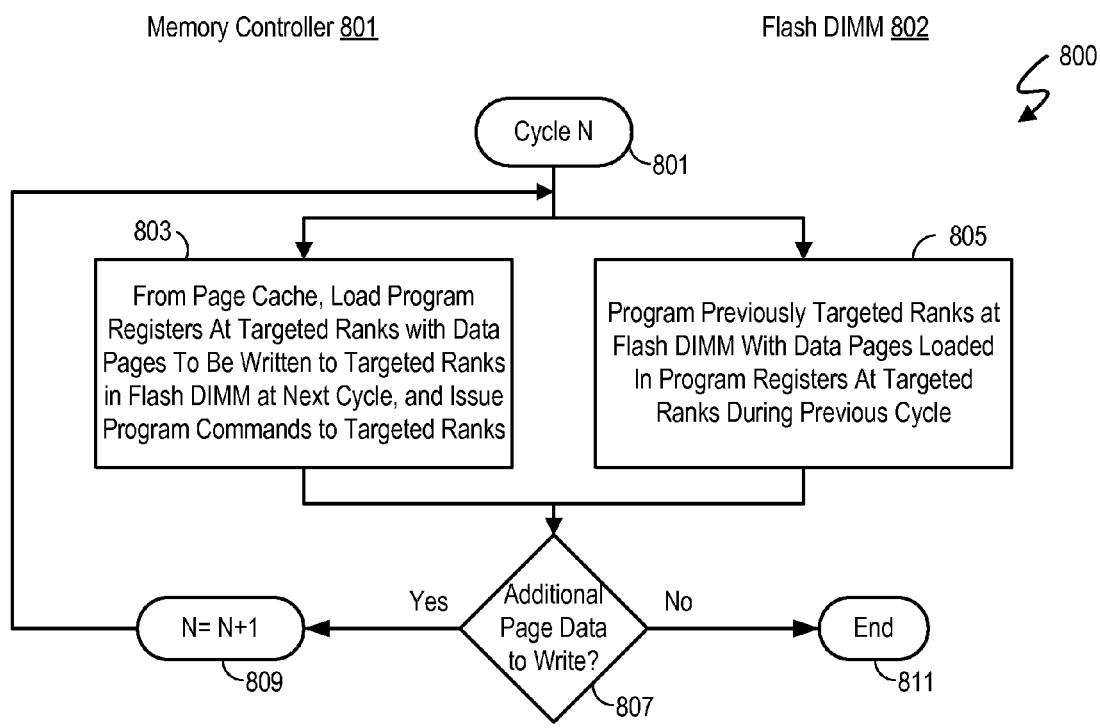
FIG. 8 depicts an example flow methodology for pipelining cache write operations to a multi-rank flash DIMM memory in accordance with selected embodiments of the present invention.

Turning now to FIG. 8, selected embodiments of the present invention may be more generally understood with reference to the depicted example flow methodology 800 for pipelining write operations to a multi-rank flash DIMM memory in accordance with selected embodiments of the present invention. For a given write cycle N (step 801), expedited write throughput to the flash DIMM 802 is achieved by simultaneously executing in parallel two different processes, namely a multi-page load operation (step 803) and a multi-page program operation (step 805). As described herein, the multi-page load operation 803 is controlled by a memory controller 801, and may be implemented by using a page cache at a memory controller 801 to sequentially load data pages into program registers of a first group of targeted memory ranks in the flash DIMM 802, where a targeted memory rank refers to the memory rank where the data pages will be programmed in the next cycle. While sequential loading is described herein, it will be understood that parallel loading may also be used to simultaneously load program registers at different targeted memory ranks. Once the data pages are loaded into the program registers of the targeted memory ranks, the memory controller 801 issues a program command to the targeted memory ranks in the flash DIMM 802 so that they can begin programming operations. However, simultaneously with the multi-page load operation 803, a multi-page program operation 805 may be implemented by programming in parallel the flash array of a second, different group of targeted memory ranks with previously loaded data pages. If there are additional pages to be loaded or programmed into the multi-rank flash DIMM memory 802 (affirmative outcome to decision 807), the multi-page load operation (step 803) and multi-page program operation (step 805) are repeated for the next cycle (step 809) until there are no more pages to be loaded or programmed (negative outcome to decision 807), in which case the process ends (step 811).

Figure 9:
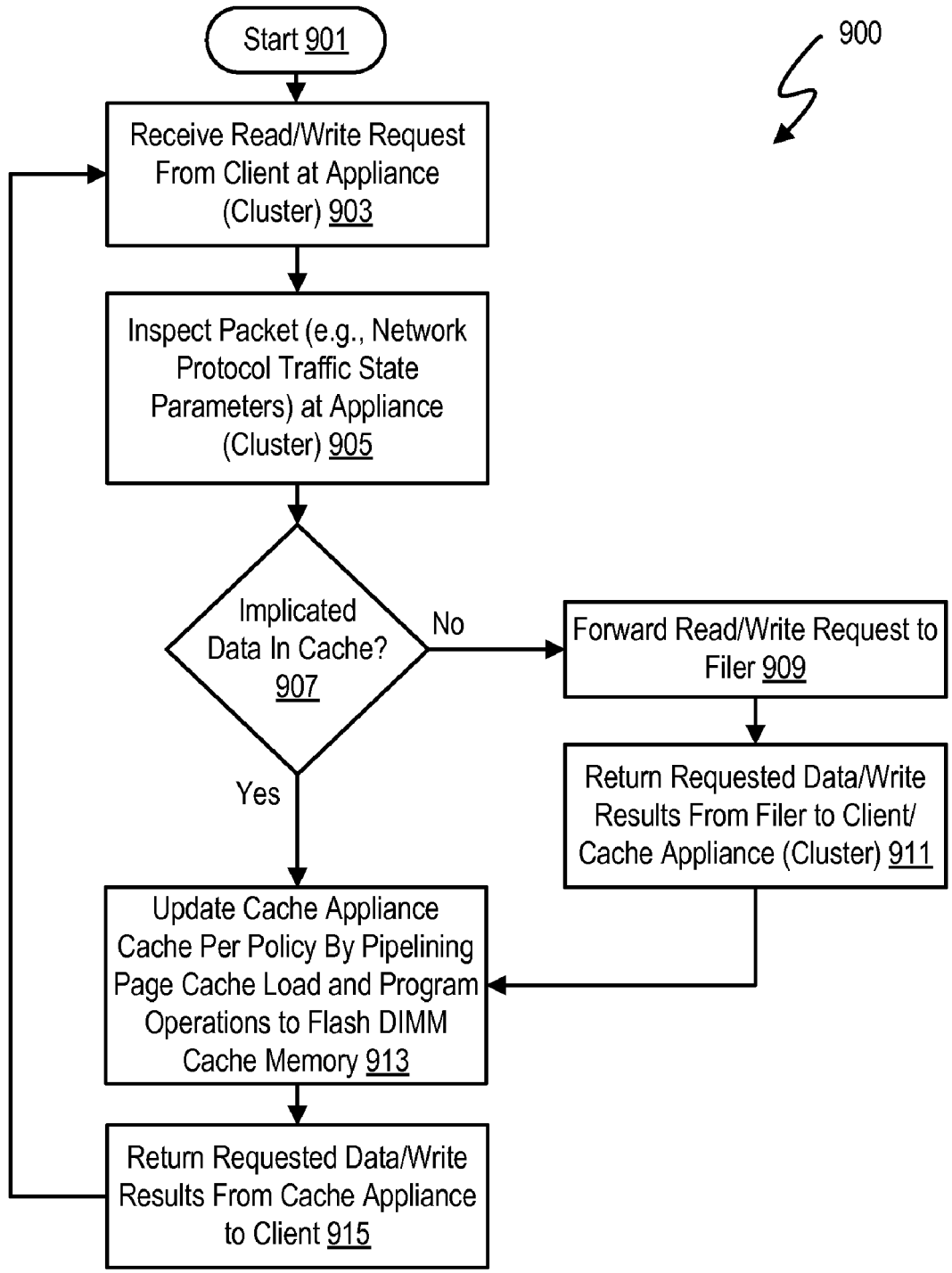
FIG. 9 depicts an example process flow sequence for caching storage data using spliced connections.

Turning now to FIG. 9, there is depicted an example process flow sequence 900 for caching storage data in a multi-rank flash DIMM at a cache appliance using spliced connections. The process starts (step 901), such as when a cache appliance is positioned between the storage clients and the NAS filers. In operation, the cache appliance operates to intercept all requests between the clients and filers and provide read and write cache acceleration by storing and recalling frequently used information. After receiving a read or write request from a client (step 903), the cache appliance (cluster) inspects the packet information associated with the request (step 905) to obtain information for moving the packet through the system (e.g., network protocol traffic state parameters). The inspected information is used to identify packets that need to be processed by the cache appliance, as well as packets that are to be forwarded by the cache appliance. By snooping network protocol traffic state parameters and splicing connections between filers and clients, the cache appliance provides Open System Interconnect (OSI) transparency, thereby performing in the Ethernet network as a bump-in-the-wire. Based on the inspected information, the cache appliance checks to see if the requested data is present within the appliance's cache memory. If so (affirmative outcome to decision 907), this is considered a read or write cache-hit, and the request is satisfied directly from the appliance's multi-rank flash DIMM cache memory (step 915) before or after updating the cache memory pursuant to the cache replacement policy (step 913). In particular, if a received write request can be serviced at the appliance's multi-rank flash DIMM cache memory, the cache is updated at step 913 by pipelining multiple page load and page program operations to different flash memory ranks in the flash DIMM cache memory. However, if there is a cache-miss (negative outcome to decision 907) and the cache appliance forwards the read/write request to the filer (step 909). The data returned by the filer may be sent to the client and/or cached in one or more cache blocks in the multi-rank flash DIMM cache memory of the cache appliance (cluster) (step 911) so that the read/write request can be satisfied from the cache appliance in the future (step 913). Either before or after the read/write request is returned to the client, the cache appliance (cluster) promotes the cache block based on the cache replacement algorithm (step 915). Any desired cache population algorithm for page replacement and cache eviction may be used to populate the cache memory in the cache appliance, including, for example, a least recently used (LRU) algorithm (e.g., LRU-K or LRU-2), a least frequently used (LFU), a least recently/frequently-used (LRFU) algorithm, an adaptive replacement cache (ARC) algorithm, a multiqueue (MQ) replacement algorithm, the 2Q algorithm which uses two queues to separate hot and cold items, a low inter-reference recency set (LIRS) algorithm.

Figure 10:
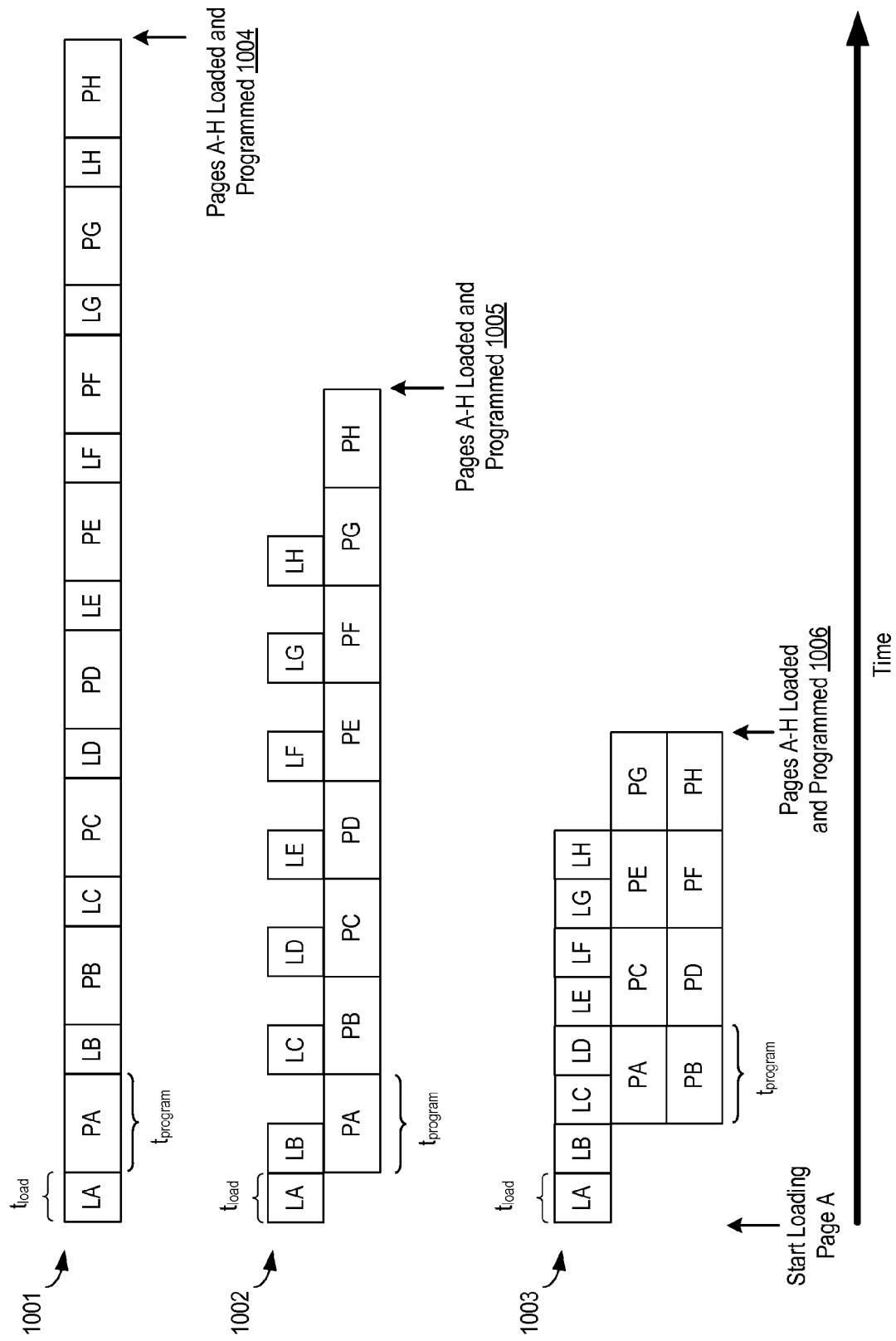
FIG. 10 depicts selected example timelines for writing multiple data pages to flash memory.

To illustrate the increase in write throughput that may be obtained by selected embodiments of the present invention, reference is made to FIG. 10 which depicts some example timelines for writing eight data pages (Pages A-H) to flash memory. Starting with timeline 1001, there is shown the total time for normal program page operations where eight pages are loaded and programmed using a data register to sequentially load and then program each page. As a consequence of this arrangement, the first page must be loaded into the data register (requiring a minimum load time $t_{load}$) and then programmed into the flash array (requiring a minimum program time $t_{program}$) before the next page (Page B) can be loaded, and so on with the remaining pages (Pages C-H). As a consequence, Pages A-H are not completely programmed until the completion time 1004.

The program page cache mode can be used to accelerate the write operations as compared to the normal program page operations, as shown by the shorter timeline 1002. With the program page cache mode, a separate cache register is used with the data register to double-buffer page write commands. With this arrangement, once the first page (Page A) is loaded into the cache register (requiring a minimum load time $t_{load}$), it is immediately transferred to the data register, thereby allowing the second page (Page B) to be loaded into the cache register. In the timeline 1002, there is no delay shown between the loading of Pages A and B, though it will be appreciated that some minimum transfer time will be required to transfer Page A from the cache register to the data register. Once Page A is stored in the data register, it can be programmed into the flash array (requiring a minimum program time $t_{program}$), but this prevents the next page (Page B) from being transferred into the data register until the programming for Page A is completed, which in turn prevents the next page (Page C) from being loaded into the cache register. Thus, the timeline 1002 shows that the page load operations overlap with the page load operations, but the Pages A-H are still sequentially programmed so that all eight pages are not completely programmed until the completion time 1005.

By pipelining multiple page write and page program operations across different memory ranks, multiple data pages can be written to a multi-rank flash DIMM cache memory in substantially less time than would be required to sequentially load and program eight pages using a normal page program operation, as shown by the timeline 1003. With multi-page pipelining, data registers in different memory ranks are separately loaded while a separate group of memory ranks are programmed in parallel. In addition, there is no need for a separate cache register at each flash device/memory rank. Another advantage of multi-page pipelining is that, once the first and second pages (Pages A and B) are loaded into the data registers of different memory ranks (each requiring a minimum load time $t_{load}$), they can each be programmed in parallel during the next cycle during which time additional pages (Pages C and D) are loaded into the data registers of another group of memory ranks. With this arrangement, Pages C and D are loaded into one group of memory ranks while pages A and B are programmed in parallel at another group of memory ranks. The resulting timeline 1003 for the multi-page pipelining shows that the programming operations for all eight pages are completed at time 1006.

In accordance with selected embodiments, additional configurations may be used to pipeline multiple page load and program operations. For example three or more page load operations may be sequentially loaded into the program register in the amount of time required to program the pages into the flash array. Alternatively, multiple pages could be loaded in parallel (instead of sequentially) into the program registers, and then subsequently programmed in parallel in the next write cycle. It may also be possible to combine the program page cache mode with the multi-page pipelining technique, such as when the flash DIMM is implemented with lower rank memory (e.g., 4-rank).

Figure 11:
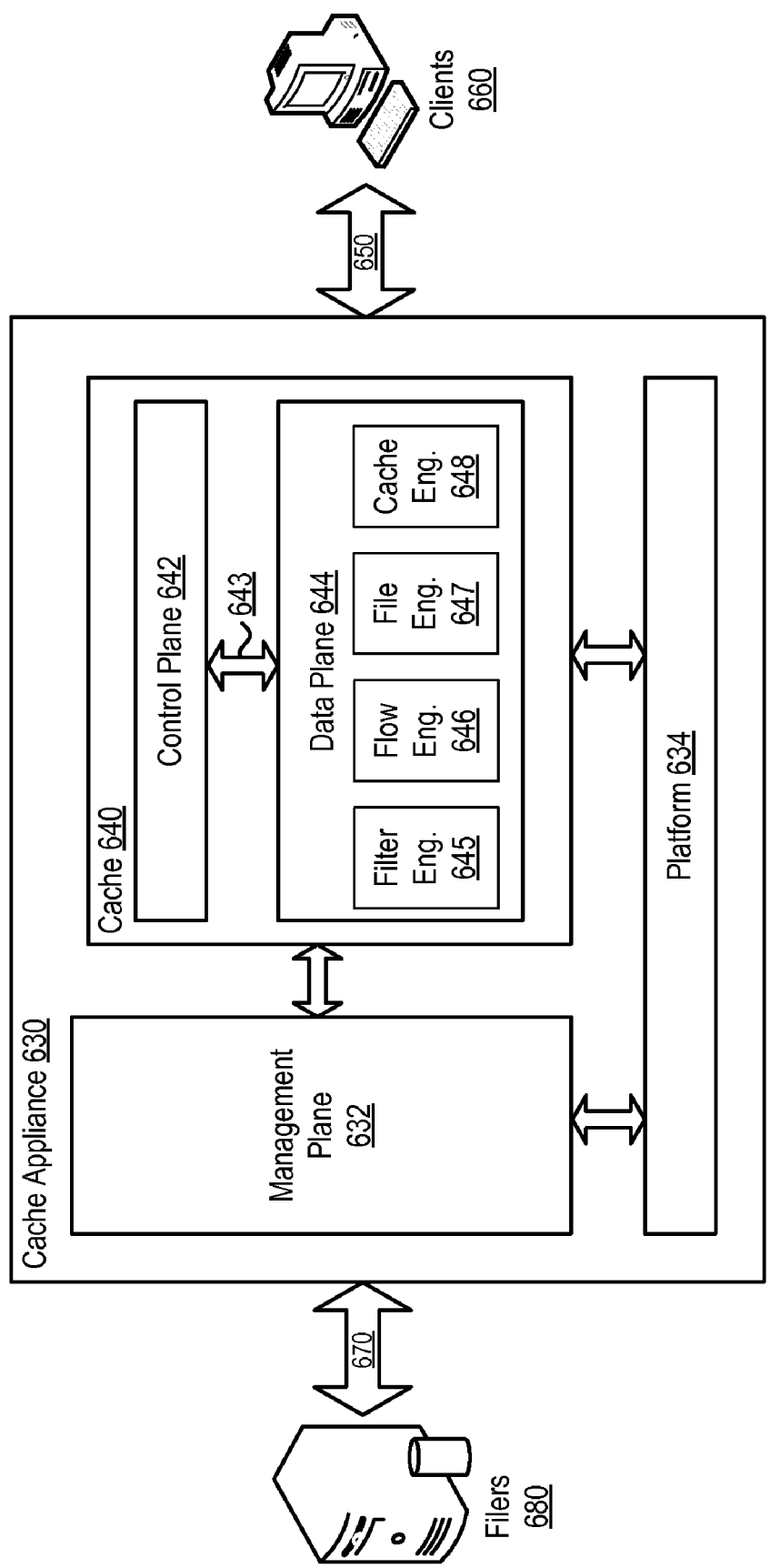
FIG. 11 depicts the overall system architecture of a non-disruptive storage cache appliance.

To illustrate the constituent component functionality of the cache appliance, reference is made to FIG. 11 which depicts the overall system architecture of a non-disruptive storage cache appliance which is configured to receive and process packets from the clients 660 and filers 680 that are sent over the connection interfaces 650, 670. The depicted architecture is divided into three logical components, including the platform component 634, the cache component 640, and the systems management component 632.

The platform component 634 includes the hardware and system software components that come together to form the basis of the system. As described hereinabove, the hardware in the platform component 634 includes the individual cache appliance (described above with reference to FIG. 4) which provides network interfaces, packet processing and cache memory. The software in the platform component 634 includes a boot loader component (for bringing the appliance to a minimal operating state), an operating system component (to provide for process scheduling, memory allocation, network, and flash file system facilities) and drivers (for extending the OS functionality and provide access to required hardware).

The cache component 640 includes the embedded software that runs on the cache appliance to implement the caching functionality on the appliance 630. By having the appliance 630 servicing I/O requests from the cache 640, responses to clients 660 are accelerated. As illustrated, the cache component software 640 includes a data plane section 644 which performs the required packet processing functions on a packet so that each packet can progress through the cache appliance 630. In other words, if something must be performed to progress a packet through the system, then it is a data plane activity. The data plane 644 processes received client and filer traffic through a pipeline of operations. At any point during the processing, the data plane 644 may forward a packet out from the cache component 640 because it is finished servicing the operation, or the packet is not pertinent to the system, or for other reasons.

The cache component software 640 also includes a control plane section 642 which performs the required processing functions about a packet to facilitate the data plane or that is not required in order to process a packet. In other words, the control plane section 642 stores control information that affects the data plane 644. If any stimulus outside of a packet traversing the system requires an operation, then it is a control plane activity. The control plane 642 is composed of standalone data structures as well as a set of managers that themselves may contain their own data structures. The interaction between the control plane 642 and the data plane 644 is via the interface 643 which can be take several forms, such as function calls, IPC requests, or direct access into a data structure's memory. As packets progress through the system, the data plane 644 queries the control plane 642 to help it perform its operations. The data plane 644 conversely sends information to the control plane 642 that it may either need in subsequent operations or that provide information to the management functions of the system. In addition, the cache component software 640 includes a management plane section 632 which performs various ancillary functions on the system that do not affect the processing of packets or that is on demand from a remote management server.

In operation, the data plane 644 includes a packet filter engine 645 that inspects received packets to identify the packets that need to be processed by the cache appliance 630, and forwards all other packets to an exit interface 650, 670. This action minimizes the impact of non-relevant packets on system resources. There are two types of packets that must be identified for further processing: cache appliance IPC packets and client/filer packets. Cache appliance IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 644 also includes a flow engine 646 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is TCP connection state for tracking sequence numbers, retransmits, etc. As from implementing split TCP connections, this occurs when the cache appliance 630 becomes a man-in-the-middle on a connection when a request (e.g., an NFS read) is intercepted and served from local cache. The flow manager implements the logic needed to be a man-in-the-middle on a split connection.

A file engine 647 in the data plane 644 handles layer 5-7 NFS, mount, CIFS, HTTP, FTP, and port mapper transactions that are used to perform protocol decode, file lookup, and transaction processing operations. In protocol decode operations, the protocol messages are delineated and decoded based on a protocol content type that is determined by the flow engine. After decode, a file lookup operation is performed using a reverse lookup of the internal file record based on filer and a protocol-specific file reference. This provides the file-specific information needed to process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 644 includes a cache engine 648 that provides fault-tolerant block-level file caching. File requests are translated into cache block accesses. A cache block is a unit of memory that is dedicated to storing file data. The blocks reside within the cache appliance memory. Even though NAS protocols are file-based, cache management may be simplified by superimposing a block approach.

By now it should be appreciated that there is provided herein a method and system for controlling data write operations to a multi-rank flash memory module, such as a cache memory module. In the disclosed methodology, two or more data pages are loaded into a first group of program registers associated with a first group of memory ranks of flash memory chips in the multi-rank flash memory module, and then programmed in parallel to the first group of memory ranks. While the data pages are being programmed in parallel into the first group of memory ranks, two or more additional data pages are simultaneously being loaded to a second group of program registers associated with a second group of memory ranks of flash memory chips in the multi-rank flash memory module. In an example embodiment, a first data page is loaded (e.g., from a page cache in a cache controller) to a first program register located in a first memory rank in the multi-rank flash memory module, and then a second data page is loaded to a second program register located in a second memory rank in the multi-rank flash memory module. Simultaneously, a third memory rank and a fourth memory rank are programmed in the multi-rank memory module with a third data page and a fourth data page, respectively, so as to overlap with the loading the first data page and second data page.

In another form, there is provided a method and system for caching data operations. As disclosed, a standalone cache unit received a request from a remote client to perform a specified data operation at one or more networked data storage devices. The packet parameters in one or more TCP/IP stack layers associated with the request are inspected to determine if the request can be serviced by a flash dual in-line memory module (DIMM) cache memory located at the standalone cache unit. If the request can be serviced by the standalone cache unit, the specified data operation is performed at the DIMM cache memory, such as by reading data specified by the request from the DIMM cache memory or writing data specified by the request to the DIMM cache memory by sequentially transferring multiple data pages to two or more memory ranks in the flash DIMM cache memory while simultaneously programming additional data pages to other flash memory ranks in the flash DIMM cache memory. In selected embodiments, data is written when the standalone cache unit programs in parallel two or more data pages into a first group of memory ranks in the DIMM cache memory, where the at least two data pages were previously loaded into a first group of program registers associated with the first group of memory ranks. While programming the data pages to the first group of memory ranks, two or more additional data pages are loaded to a second group of program registers associated with a second group of memory ranks in the DIMM cache memory.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive, adaptive storage caching using clustered cache appliances with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A standalone cache unit for caching data operations requested from one or more networked data storage devices by one or more remote clients, the standalone cache unit comprising:
   a flash dual in-line memory module (DIMM) cache memory for caching data that is requested by a remote client;
   a packet processor coupled to the flash DIMM cache memory and to one or more I/O ports for transparently splicing connections between the data storage devices and remote clients, where the packet processor inspects network protocol traffic state parameters received on the I/O ports to determine if a request from a remote client can be serviced by the standalone cache unit; and
   a cache control module for controlling caching operations in the flash DIMM cache memory.

2. The standalone cache unit of claim 1, where the flash DIMM cache memory comprises a multi-rank flash DIMM.

3. The standalone cache unit of claim 1, where the flash DIMM comprises a plurality of ranks of NAND flash memory devices.

4. The standalone cache unit of claim 1, where the flash DIMM comprises a plurality of ranks of NAND flash memory devices, where each rank comprises a plurality of 2 GB flash NAND memory devices.

5. The standalone cache unit of claim 1, where the flash DIMM comprises:
   a first group of flash memory ranks with one or more associated first program registers for writing data to the first group of flash memory ranks, and
   a second group of flash memory ranks with one or more associated second program registers for writing data to the second group of flash memory ranks.

6. The standalone cache unit of claim 5, where the cache control module is configured to sequentially load two or more data pages to the one or more associated first program registers while two or more additional data pages are programmed into the second group of flash memory ranks from the one or more associated second program registers.

7. The standalone cache unit of claim 1, where the cache control module configured to pipeline multiple page write and page program operations to different memory ranks in the flash DIMM cache memory.

8. The standalone cache unit of claim 1, where the cache controller comprises a page cache for sequentially transferring multiple data pages to program registers in two or more memory ranks in the flash DIMM cache memory while data pages that were previously transferred to program registers in other memory ranks in the flash DIMM cache memory are simultaneously being programmed.

9. The standalone cache unit of claim 1, where the packet processor executes software that transparently monitors NFS and CIFS traffic between remote clients and NAS subsystems.

10. A method for controlling data write operations to a multi-rank flash memory module, comprising:
    programming in parallel at least two data pages into a first group of memory ranks of flash memory chips in the multi-rank flash memory module, where the at least two data pages were previously loaded into a first group of program registers associated with the first group of memory ranks; and
    loading at least two additional data pages to a second group of program registers associated with a second group of memory ranks of flash memory chips in the multi-rank flash memory module while programming in parallel the at least two data pages into the first group of memory ranks.

11. The method of claim 10, where loading at least two additional data pages comprises:
    loading a first data page to a first program register located in a first memory rank in the multi-rank flash memory module, and then
    loading a second data page to a second program register located in a second memory rank in the multi-rank flash memory module,
    where the first and second data page are loaded while programming in parallel the at least two data pages into the first group of memory ranks.

12. The method of claim 11, where programming in parallel at least two data pages comprises simultaneously programming a third memory rank and a fourth memory rank in the multi-rank memory module with a third data page and a fourth data page, respectively, so as to overlap with the loading the first data page and second data page.

13. The method of claim 10, where programming in parallel at least two data pages comprises programming in parallel at least two data pages into a first group of memory ranks in a multi-rank flash cache memory module.

14. The method of claim 10, where loading at least two additional data pages comprises sequentially loading the at least two additional data pages from a page cache in a cache controller to the second group of program registers associated with the second group of memory ranks a multi-rank flash cache memory module.

15. The method of claim 10, where the data write operations comprise data write operations to a multi-rank flash dual in-line memory module (DIMM).

16. A method for caching data operations, comprising:
   receiving at a standalone cache unit a request from a remote client to perform a specified data operation at one or more networked data storage devices;
   inspecting packet parameters in one or more TCP/IP stack layers associated with the request to determine if the request can be serviced by a flash dual in-line memory module (DIMM) cache memory located at the standalone cache unit; and
   performing the specified data operation at the DIMM cache memory if the request can be serviced by the standalone cache unit.

17. The method of claim 16, where performing the specified data operation at the DIMM cache memory comprises reading data specified by the request from the DIMM cache memory.

18. The method of claim 16, where performing the specified data operation at the DIMM cache memory comprises writing data specified by the request to the DIMM cache memory.

19. The method of claim 18, where writing data specified by the request comprises:
   programming in parallel at least two data pages into a first group of memory ranks in the DIMM cache memory, where the at least two data pages were previously loaded into a first group of program registers associated with the first group of memory ranks; and
   loading at least two additional data pages to a second group of program registers associated with a second group of memory ranks in the DIMM cache memory while programming in parallel the at least two data pages into the first group of memory ranks.

20. The method of claim 16, where performing the specified data operation at the DIMM cache memory comprises sequentially transferring multiple data pages to two or more memory ranks in the flash DIMM cache memory while simultaneously programming additional data pages to other flash memory ranks in the flash DIMM cache memory.

* * * * *